(12) United States Patent
Le et al.

(10) Patent No.: US 10,990,099 B2
(45) Date of Patent: Apr. 27, 2021

(54) MOTION PLANNING METHODS AND SYSTEMS FOR AUTONOMOUS VEHICLE

(71) Applicant: Great Wall Motor Company Limited, Baoding (CN)

(72) Inventors: Duong Le, Westland, MI (US); Kai Zhang, Carmel, IN (US); Zhichao Liu, Novi, MI (US)

(73) Assignee: Great Wall Motor Company Limited, Baoding (CN)

( * ) Notice: Subject to any disclaimer, the term of this patent is extended or adjusted under 35 U.S.C. 154(b) by 216 days.

(21) Appl. No.: 16/230,121

(22) Filed: Dec. 21, 2018

(65) Prior Publication Data

US 2020/0159216 A1  May 21, 2020

Related U.S. Application Data

(60) Provisional application No. 62/768,439, filed on Nov. 16, 2018.

(51) Int. Cl.
*G05D 1/08* (2006.01)
*G05D 1/00* (2006.01)
*G05B 15/02* (2006.01)
*G05D 1/02* (2020.01)

(52) U.S. Cl.
CPC .......... *G05D 1/0088* (2013.01); *G05B 15/02* (2013.01); *G05D 1/0214* (2013.01); *G05D 2201/0213* (2013.01)

(58) Field of Classification Search
CPC ............ B60W 30/182; B60W 40/105; B60W 2520/06; B60W 2520/10; B60W 2540/18; G05D 1/0221; G05D 1/0088
See application file for complete search history.

(56) References Cited

U.S. PATENT DOCUMENTS

| | | | |
|---|---|---|---|
| 8,965,691 B1 * | 2/2015 | Lombrozo | B60W 40/10 701/498 |
| 9,566,986 B1 * | 2/2017 | Gordon | B60W 50/12 |
| 2017/0228662 A1 * | 8/2017 | Gu | G06N 3/0427 |
| 2017/0305374 A1 * | 10/2017 | Hong | B60R 21/0132 |
| 2018/0129203 A1 * | 5/2018 | Tafti | G05D 1/0005 |
| 2018/0329418 A1 * | 11/2018 | Baalke | G05D 1/024 |
| 2018/0356819 A1 * | 12/2018 | Mahabadi | B60W 30/09 |
| 2019/0079523 A1 * | 3/2019 | Zhu | G05D 1/0217 |
| 2019/0079528 A1 * | 3/2019 | Zhu | B60W 30/143 |
| 2019/0080266 A1 * | 3/2019 | Zhu | G01C 21/3453 |
| 2019/0086932 A1 * | 3/2019 | Fan | G08G 1/163 |

(Continued)

*Primary Examiner* — Peter D Nolan
*Assistant Examiner* — Wae L Louie
(74) *Attorney, Agent, or Firm* — Young Basile Hanlon & MacFarlane, P.C.

(57) ABSTRACT

Disclosed herein are methods and systems for motion planning in an autonomous vehicle (AV) that separate path planning and velocity planning and may use reference lines in combination with motion planners to determine paths. The method may include reference lines to project planning data into a S-L coordinate system. A motion planner algorithm uses the reference lines and previous path planning history to generate a path in the S-L coordinate system. A velocity is determined for the path. An AV controller is updated with the path and the velocity. Motion planning computations use a dynamic vehicle look-up table to determine possible vehicle motions based on an initial state and control input.

20 Claims, 10 Drawing Sheets

(56) References Cited

U.S. PATENT DOCUMENTS

2019/0278284 A1* 9/2019 Zhang .............. G08G 1/096708
2020/0125094 A1* 4/2020 Zhang ................. G05D 1/0214
2020/0156639 A1* 5/2020 Liu .................... B60W 40/105
2020/0159216 A1* 5/2020 Le ........................ G05D 1/0088

* cited by examiner

MOTION PLANNING METHODS AND SYSTEMS FOR AUTONOMOUS VEHICLE

CROSS-REFERENCE TO RELATED APPLICATIONS

This application claims priority to and the benefit of U.S. Provisional Application Patent Ser. No. 62/768,439, filed Nov. 16, 2018, the entire disclosure of which is hereby incorporated by reference.

This application is related to application entitled "MEMORY-BASED OPTIMAL MOTION PLANNING WITH DYNAMIC MODEL FOR AUTOMATED VEHICLE" having a Ser. No 16/230,094, filed on same date, the entire disclosure of which is hereby incorporated by reference.

TECHNICAL FIELD

This disclosure relates to autonomous vehicles. More specifically, this disclosure relates to motion planning for on-road autonomous vehicles.

BACKGROUND

Autonomous vehicles use sampling-based motion planners such as Rapidly-exploring Random Trees (RRT) and its variants for path planning. By iteratively creating an exploration tree, these methods have the property of covering the whole search space and search for the solution. However, implementing sampling-based motion planners for autonomous on road vehicle poses several challenges. The motion planners must account for vehicle dynamics. This increases the dimensionality of the search problem and results in increasing the search time. In addition, the exploration rate of RRT and its variants often get stuck or slow down in a complex environment (for example, a curvy road). As a result, the motion planner often fails or generates a poor solution. Another drawback of RRT and its variants is the use of random sampling. Although this assists in covering the search space rapidly, the solutions do not always guarantee optimality, and change in each planning cycle.

SUMMARY

Disclosed herein are methods and systems for motion planning that separate path planning and velocity planning and where path planning may use reference lines in combination with sampling-based motion planners to determine paths. A method for motion planning in an autonomous vehicle (AV) separates path planning and velocity planning and may use reference lines in combination with motion planners to determine paths. The method may include reference lines to project planning data into a S-L coordinate system. A motion planner algorithm uses the reference lines and previous path planning history to generate a path in the S-L coordinate system. A velocity is determined for the path. An AV controller is updated with the path and the velocity. Motion planning computations use a dynamic vehicle look-up table to determine possible vehicle motions based on an initial state and control input.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
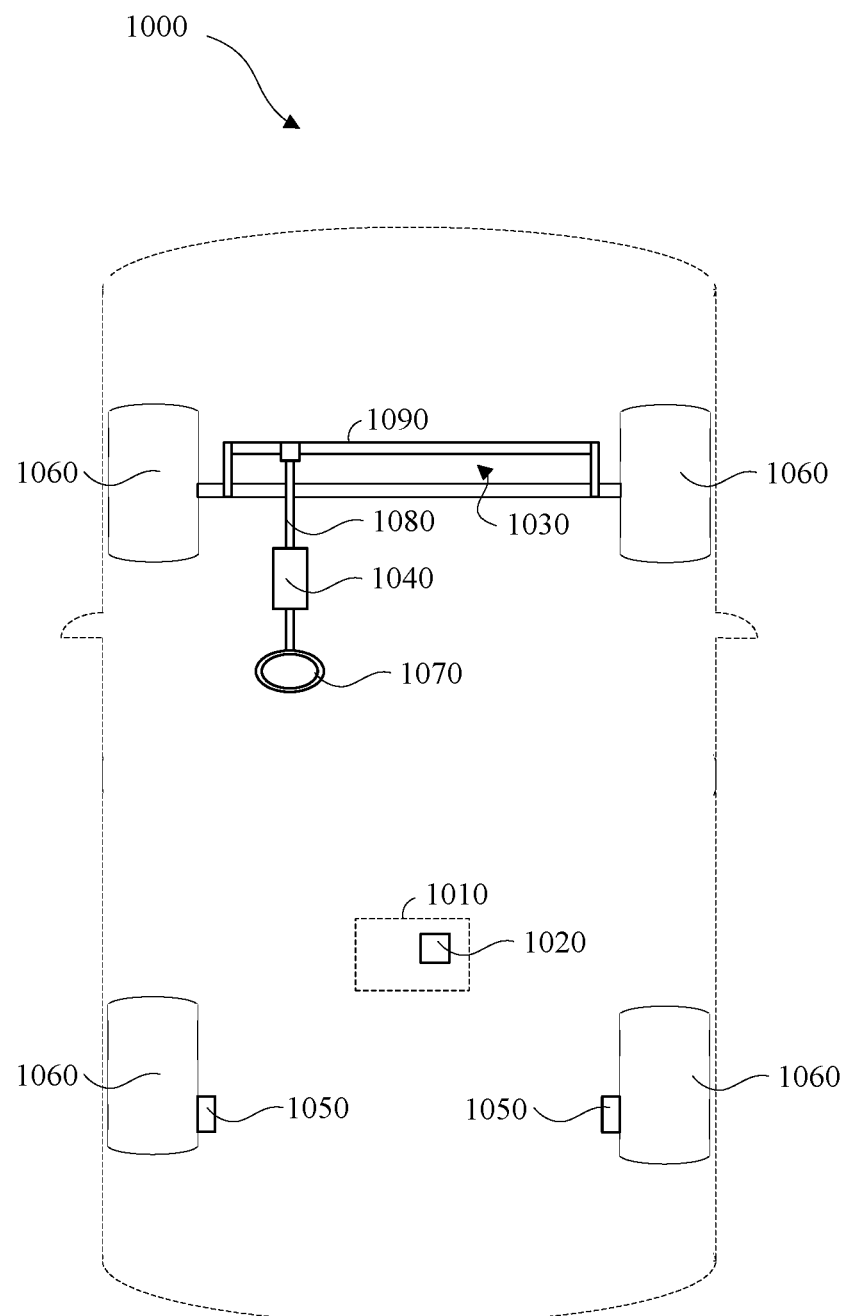
FIG. 1 is a diagram of an example of a vehicle in accordance with embodiments of this disclosure.

Reference will now be made in greater detail to a preferred embodiment of the invention, an example of which is illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices and methods shown and described herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Autonomous vehicles use sampling-based motion planners such as Rapidly-exploring Random Trees (RRTs) and its variants for path planning. By iteratively creating an exploration tree, these methods have the property of covering the whole search space and search for the solution. However, implementing sampling-based motion planners for autonomous on road vehicle poses several challenges. The motion planners must account for vehicle dynamics. This increases the dimensionality of the search problem and results in increasing the search time. In addition, the exploration rate of RRT and its variants often get stuck or slow down in a complex environment (for example, a curvy road). As a result, the motion planner often fails or generates a poor solution. Another drawback of RRT and its variants is the use of random sampling. Although this assists in covering the search space rapidly, the solutions do not always guarantee optimality, and change in each planning cycle.

An autonomous vehicle includes an object detection system, a navigation system, and a controller system. The object detection system is configured to determine whether other vehicles or objects like pedestrians and cyclists will intersect the travel path of the host vehicle. The navigation system is configured to determine a travel path for the host vehicle. The controller system is configured to communicate with the object detection system and the navigation system to operate a steering/acceleration profile for the host vehicle that avoids the potential collisions with other vehicles or objects. The navigation systems described herein use a method for motion planning that separates path planning and velocity planning and where path planning may use reference lines in combination with sampling-based motion planners to determine paths. The described motion planning method may provide an efficient motion planner which operates in real-time and generates a feasible, safe and conformal motion for vehicle motion.

FIG. 1 is a diagram of an example of a vehicle 1000 in accordance with embodiments of this disclosure. The vehicle 1000 may be an autonomous vehicle (AV) or a semi-autonomous vehicle. As shown in FIG. 1, the vehicle 1000 includes a control system 1010. The control system 1010 may be referred to as a controller. The control system 1010 includes a processor 1020. The processor 1020 is programmed to command application of one of up to a predetermined steering torque value and up to a predetermined net asymmetric braking force value. Each predetermined force is selected to achieve a predetermined vehicle yaw torque that is at most the lesser of a first maximum yaw torque resulting from actuating a steering system 1030 and a second maximum yaw torque resulting from actuating a brake system.

The steering system 1030 may include a steering actuator 1040 that is an electric power-assisted steering actuator. The brake system may include one or more brakes 1050 coupled to respective wheels 1060 of the vehicle 1000. Additionally, the processor 1020 may be programmed to command the brake system to apply a net asymmetric braking force by each brake 1050 applying a different braking force than the other brakes 1050.

The processor 1020 may be further programmed to command the brake system to apply a braking force, for example a net asymmetric braking force, in response to a failure of the steering system 1030. Additionally or alternatively, the processor 1020 may be programmed to provide a warning to an occupant in response to the failure of the steering system 1030. The steering system 1030 may be a power-steering control module. The control system 1010 may include the steering system 1030. Additionally, the control system 1010 may include the brake system.

The steering system 1030 may include a steering actuator 1040 that is an electric power-assisted steering actuator. The brake system may include two brakes 1050 coupled to respective wheels 1060 on opposite sides of the vehicle 1000. Additionally, the method may include commanding the brake system to apply a net asymmetric braking force by each brake 1050 applying a different braking force.

The control system 1010 allows one of the steering system 1030 and the brake system to take over for the other of the steering system 1030 and the brake system if the other fails while the vehicle 1000 is executing a turn. Whichever of the steering system 1030 and the braking system remains operable is then able to apply sufficient yaw torque to the vehicle 1000 to continue the turn. The vehicle 1000 is therefore less likely to impact an object such as another vehicle or a roadway barrier, and any occupants of the vehicle 1000 are less likely to be injured.

The vehicle 1000 may operate in one or more of the levels of autonomous vehicle operation. For purposes of this disclosure, an autonomous mode is defined as one in which each of propulsion (e.g., via a powertrain including an electric motor and/or an internal combustion engine), braking, and steering of the vehicle 1000 are controlled by the processor 1020; in a semi-autonomous mode the processor 1020 controls one or two of the propulsion, braking, and steering of the vehicle 1000. Thus, in one example, non-autonomous modes of operation may refer to SAE levels 0-1, partially autonomous or semi-autonomous modes of operation may refer to SAE levels 2-3, and fully autonomous modes of operation may refer to SAE levels 4-5.

Figure 2:
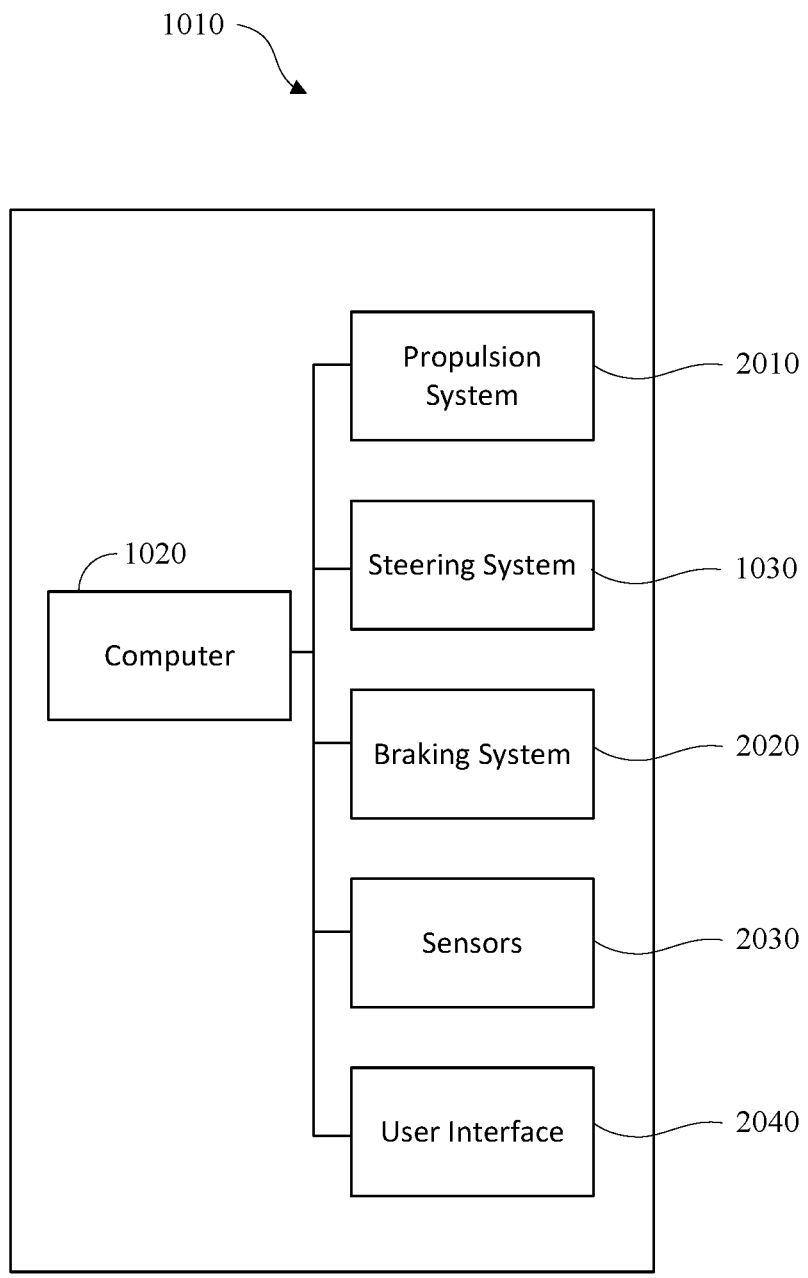
FIG. 2 is a diagram of an example of the control system shown in FIG. 1.

With reference to FIG. 2, the control system 1010 includes the processor 1020. The processor 1020 is included in the vehicle 1000 for carrying out various operations, including as described herein. The processor 1020 is a computing device that generally includes a processor and a memory, the memory including one or more forms of computer-readable media, and storing instructions executable by the processor for performing various operations, including as disclosed herein. The memory of the processor 1020 further generally stores remote data received via various communications mechanisms; e.g., the processor 1020 is generally configured for communications on a communications network within the vehicle 1000. The processor 1020 may also have a connection to an onboard diagnostics connector (OBD-II). Although one processor 1020 is shown in FIG. 2 for ease of illustration, it is to be understood that the processor 1020 could include, and various operations described herein could be carried out by, one or more computing devices. The processor 1020 may be a control module, for example, a power-steering control module, or may include a control module among other computing devices.

The control system 1010 may transmit signals through the communications network, which may be a controller area network (CAN) bus, Ethernet, Local Interconnect Network (LIN), Bluetooth, and/or by any other wired or wireless communications network. The processor 1020 may be in communication with a propulsion system 2010, the steering system 1030, the brake system 2020, sensors 2030, and/or a user interface 2040, among other components.

With continued reference to FIG. 2, the propulsion system 2010 of the vehicle 1000 generates energy and translates the energy into motion of the vehicle 1000. The propulsion system 2010 may be a known vehicle propulsion subsystem, for example, a conventional powertrain including an internal-combustion engine coupled to a transmission that transfers rotational motion to road wheels 1060; an electric powertrain including batteries, an electric motor, and a transmission that transfers rotational motion to the road wheels 1060; a hybrid powertrain including elements of the conventional powertrain and the electric powertrain; or any other type of propulsion. The propulsion system 2010 is in communication with and receives input from the processor 1020 and from a human driver. The human driver may control the propulsion system 2010 via, e.g., an accelerator pedal and/or a gear-shift lever (not shown).

With reference to FIGS. 1 and 2, the steering system 1030 is typically a known vehicle steering subsystem and controls the turning of the road wheels 1060. The steering system 1030 is in communication with and receives input from a steering wheel 1070 and the processor 1020. The steering system 1030 may be a rack-and-pinion system with electric power-assisted steering via a steering actuator 1040, a steer-by-wire system, as are both known in the art, or any other suitable system. The steering system 1030 may include the steering wheel 1070 fixed to a steering column 1080 coupled to a steering rack 1090.

With reference to FIG. 1, the steering rack 1090 is turnably coupled to the road wheels 1060, for example, in a four-bar linkage. Translational motion of the steering rack 1090 results in turning of the road wheels 1060. The steering column 1080 may be coupled to the steering rack 1090 via a rack-and-pinion, that is, gear meshing between a pinion gear and a rack gear (not shown).

The steering column 1080 transfers rotation of the steering wheel 1070 to movement of the steering rack 1090. The steering column 1080 may be, e.g., a shaft connecting the steering wheel 1070 to the steering rack 1090. The steering column 1080 may house a torsion sensor and a clutch (not shown).

The steering wheel 1070 allows an operator to steer the vehicle 1000 by transmitting rotation of the steering wheel 1070 to movement of the steering rack 1090. The steering wheel 1070 may be, e.g., a rigid ring fixedly attached to the steering column 1080 such as is known.

With continued reference to FIG. 1, the steering actuator 1040 is coupled to the steering system 1030, e.g., the steering column 1080, so as to cause turning of the road wheels 1060. For example, the steering actuator 1040 may be an electric motor rotatably coupled to the steering column 1080, that is, coupled so as to be able to apply a steering torque to the steering column 1080. The steering actuator 1040 may be in communication with the processor 1020.

The steering actuator 1040 may provide power assist to the steering system 1030. In other words, the steering actuator 1040 may provide torque in a direction in which the steering wheel 1070 is being rotated by a human driver, allowing the driver to turn the steering wheel 1070 with less effort. The steering actuator 1040 may be an electric power-assisted steering actuator.

With reference to FIGS. 1 and 2, the brake system 2020 is typically a known vehicle braking subsystem and resists the motion of the vehicle 1000 to thereby slow and/or stop the vehicle 1000. The brake system 2020 includes brakes 1050 coupled to the road wheels 1060. The brakes 1050 may be friction brakes such as disc brakes, drum brakes, band brakes, and so on; regenerative brakes; any other suitable type of brakes; or a combination. The brakes 1050 may be coupled to, e.g., respective road wheels 1060 on opposite sides of the vehicle 1000. The brake system 2020 is in communication with and receives input from the processor 1020 and a human driver. The human driver may control the braking via, e.g., a brake pedal (not shown).

With reference to FIG. 2, the vehicle 1000 may include the sensors 2030. The sensors 2030 may detect internal states of the vehicle 1000, for example, wheel speed, wheel orientation, and engine and transmission variables. The sensors 2030 may detect the position or orientation of the vehicle 1000, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 2030 may detect the external world, for example, radar sensors, scanning laser range finders, light detection and ranging (LIDAR) devices, and image processing sensors such as cameras. The sensors 2030 may include communications devices, for example, vehicle-to-infrastructure (V2I) devices, vehicle-to-vehicle (V2V) devices, or vehicle-to-everything (V2E) devices.

The user interface 2040 presents information to and receives information from an occupant of the vehicle 1000. The user interface 2040 may be located, e.g., on an instrument panel in a passenger cabin (not shown) of the vehicle 1000, or wherever may be readily seen by the occupant. The user interface 2040 may include dials, digital readouts, screens, speakers, and so on for output, i.e., providing information to the occupant, e.g., a human-machine interface (HMI) including elements such as are known. The user interface 2040 may include buttons, knobs, keypads, touchscreens, microphones, and so on for receiving input, i.e., information, instructions, etc., from the occupant.

Figure 3:
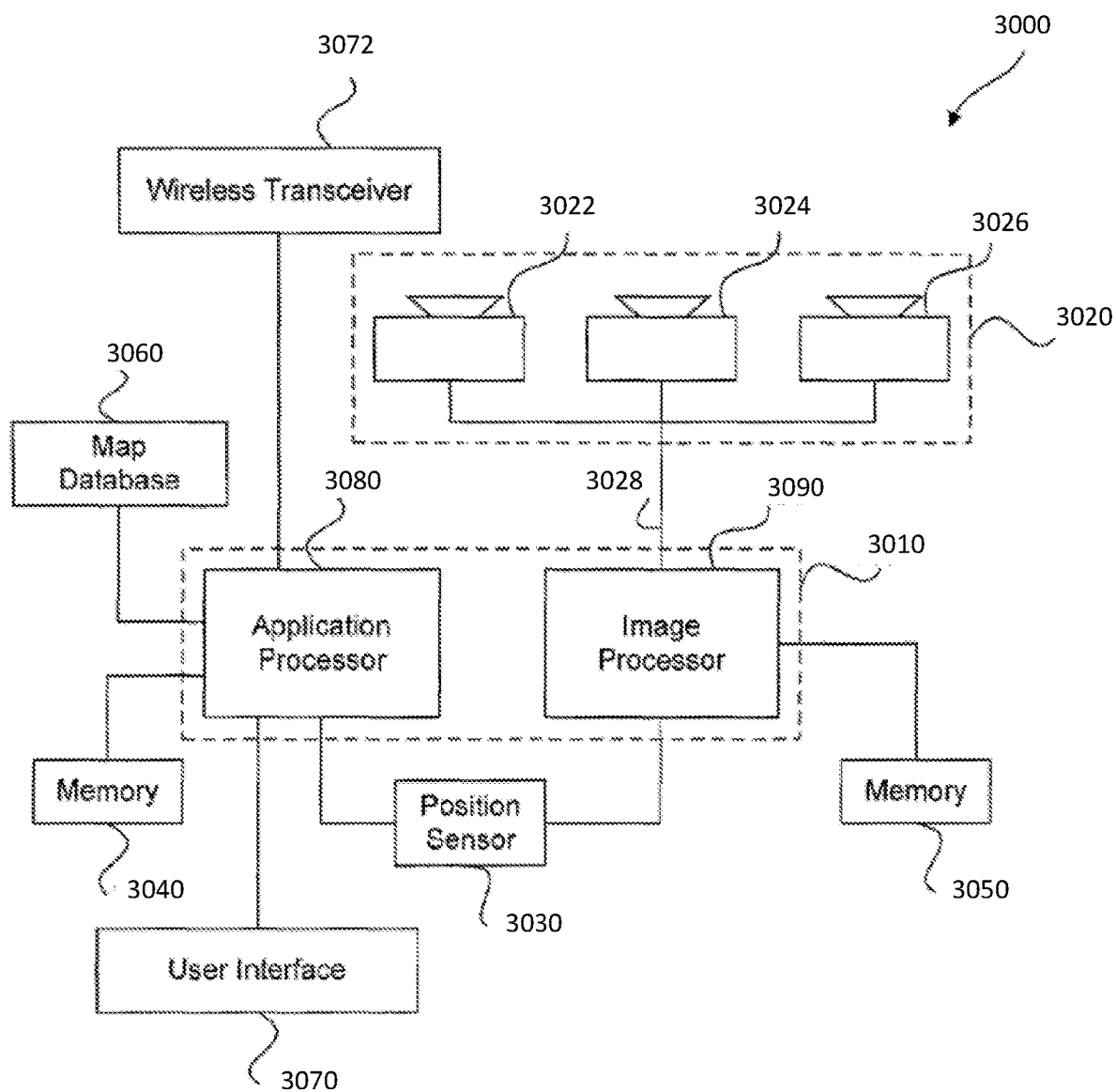
FIG. 3 is a diagram of an example of a vehicle control system in accordance with embodiments of this disclosure.

FIG. 3 is a diagram of an example of a vehicle control system 3000 in accordance with embodiments of this disclosure. Vehicle control system 3000 may include various components depending on the requirements of a particular implementation. In some embodiments, vehicle control system 3000 may include a processing unit 3010, an image acquisition unit 3020, a position sensor 3030, one or more memory units 3040, 3050, a map database 3060, a user interface 3070, and a wireless transceiver 3072. Processing unit 3010 may include one or more processing devices. In some embodiments, processing unit 3010 may include an applications processor 3080, an image processor 3090, or any other suitable processing device. Similarly, image acquisition unit 3020 may include any number of image acquisition devices and components depending on the requirements of a particular application. In some embodiments, image acquisition unit 3020 may include one or more image capture devices (e.g., cameras, CCDs, or any other type of image sensor), such as image capture device 3022, image capture device 3024, and image capture device 3026. System 3000 may also include a data interface 3028 communicatively connecting processing unit 3010 to image acquisition unit 3020. For example, data interface 3028 may include any wired and/or wireless link or links for transmitting image data acquired by image acquisition unit 3020 to processing unit 3010.

Wireless transceiver 3072 may include one or more devices configured to exchange transmissions over an air interface to one or more networks (e.g., cellular, the Internet, etc.) by use of a radio frequency, infrared frequency, magnetic field, or an electric field. Wireless transceiver 3072 may use any known standard to transmit and/or receive data (e.g., Wi-Fi, Bluetooth®, Bluetooth Smart, 802.15.4, ZigBee, etc.). Such transmissions may include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 3080 and image processor 3090 may include various types of hardware-based processing devices. For example, either or both of applications processor 3080 and image processor 3090 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, or the like.

In some embodiments, applications processor 3080 and/or image processor 3090 may include multiple processing units with local memory and instruction sets. Such processors may include video inputs for receiving image data from multiple image sensors and may also include video out capabilities. In one example, the processor may use 90 nm-micron technology operating at 332 Mhz.

Any of the processing devices disclosed herein may be configured to perform certain functions. Configuring a processing device, such as any of the described processors, other controllers or microprocessors, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware-based components of a host vehicle.

While FIG. 3 depicts two separate processing devices included in processing unit 3010, more or fewer processing devices may be used. For example, in some embodiments, a single processing device may be used to accomplish the tasks of applications processor 3080 and image processor 3090. In other embodiments, these tasks may be performed by more than two processing devices. Further, in some embodiments, vehicle control system 3000 may include one or more of processing unit 3010 without including other components, such as image acquisition unit 3020.

Processing unit 3010 may comprise various types of devices. For example, processing unit 3010 may include various devices, such as a controller, an image preprocessor, a central processing unit (CPU), support circuits, digital signal processors, integrated circuits, memory, or any other types of devices for image processing and analysis. The image preprocessor may include a video processor for capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 3010. In another instance, the memory may be integrated into the processing unit 3010.

Each memory 3040, 3050 may include software instructions that when executed by a processor (e.g., applications processor 3080 and/or image processor 3090), may control operation of various aspects of vehicle control system 3000. These memory units may include various databases and image processing software, as well as a trained system, such as a neural network, or a deep neural network, for example. The memory units may include random access memory, read only memory, flash memory, disk drives, optical storage, tape storage, removable storage and/or any other types of storage. In some embodiments, memory units 3040, 3050 may be separate from the applications processor 3080 and/or image processor 3090. In other embodiments, these memory units may be integrated into applications processor 3080 and/or image processor 3090.

Position sensor 3030 may include any type of device suitable for determining a location associated with at least one component of vehicle control system 3000. In some embodiments, position sensor 3030 may include a GPS receiver. Such receivers can determine a user position and velocity by processing signals broadcasted by global positioning system satellites. Position information from position sensor 3030 may be made available to applications processor 3080 and/or image processor 3090.

In some embodiments, vehicle control system 3000 may include components such as a speed sensor (e.g., a speedometer) for measuring a speed of vehicle 1000. Vehicle control system 3000 may also include one or more accelerometers (either single axis or multi-axis) for measuring accelerations of vehicle 1000 along one or more axes.

The memory units 3040, 3050 may include a database, or data organized in any other form, that indication a location of known landmarks. Sensory information (such as images, radar signal, depth information from lidar or stereo processing of two or more images) of the environment may be processed together with position information, such as a GPS coordinate, vehicle's ego motion, etc. to determine a current location of the vehicle relative to the known landmarks, and refine the vehicle location.

User interface 3070 may include any device suitable for providing information to or for receiving inputs from one or more users of vehicle control system 3000. In some embodiments, user interface 3070 may include user input devices, including, for example, a touchscreen, microphone, keyboard, pointer devices, track wheels, cameras, knobs, buttons, or the like. With such input devices, a user may be able to provide information inputs or commands to vehicle control system 3000 by typing instructions or information, providing voice commands, selecting menu options on a screen using buttons, pointers, or eye-tracking capabilities, or through any other suitable techniques for communicating information to vehicle control system 3000.

User interface 3070 may be equipped with one or more processing devices configured to provide and receive information to or from a user and process that information for use by, for example, applications processor 3080. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 3070 may include a display, speaker, tactile device, and/or any other devices for providing output information to a user.

Map database 3060 may include any type of database for storing map data useful to vehicle control system 3000. In some embodiments, map database 3060 may include data relating to the position, in a reference coordinate system, of various items, including roads, water features, geographic features, businesses, points of interest, restaurants, gas stations, etc. Map database 3060 may store not only the locations of such items, but also descriptors relating to those items, including, for example, names associated with any of the stored features. In some embodiments, map database 3060 may be physically located with other components of vehicle control system 3000. Alternatively or additionally, map database 3060 or a portion thereof may be located remotely with respect to other components of vehicle control system 3000 (e.g., processing unit 3010). In such embodiments, information from map database 3060 may be downloaded over a wired or wireless data connection to a network (e.g., over a cellular network and/or the Internet, etc.). In some cases, map database 3060 may store a sparse data model including polynomial representations of certain road features (e.g., lane markings) or target trajectories for the host vehicle. Map database 3060 may also include stored representations of various recognized landmarks that may be used to determine or update a known position of the host vehicle with respect to a target trajectory. The landmark representations may include data fields such as landmark type, landmark location, among other potential identifiers.

Image capture devices 3022, 3024, and 3026 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 3022, 3024, and 3026 will be further described with reference to FIG. 4 below.

One or more cameras (e.g., image capture devices 3022, 3024, and 3026) may be part of a sensing block included on a vehicle. Various other sensors may be included in the sensing block, and any or all of the sensors may be relied upon to develop a sensed navigational state of the vehicle. In addition to cameras (forward, sideward, rearward, etc), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RF, etc.) that may receive from a source remotely located with respect to the host vehicle sensor-based information or any other type of information relating to the environment of the host vehicle. Such information may include sensor output information, or related information, received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, or the like.

Figure 4:
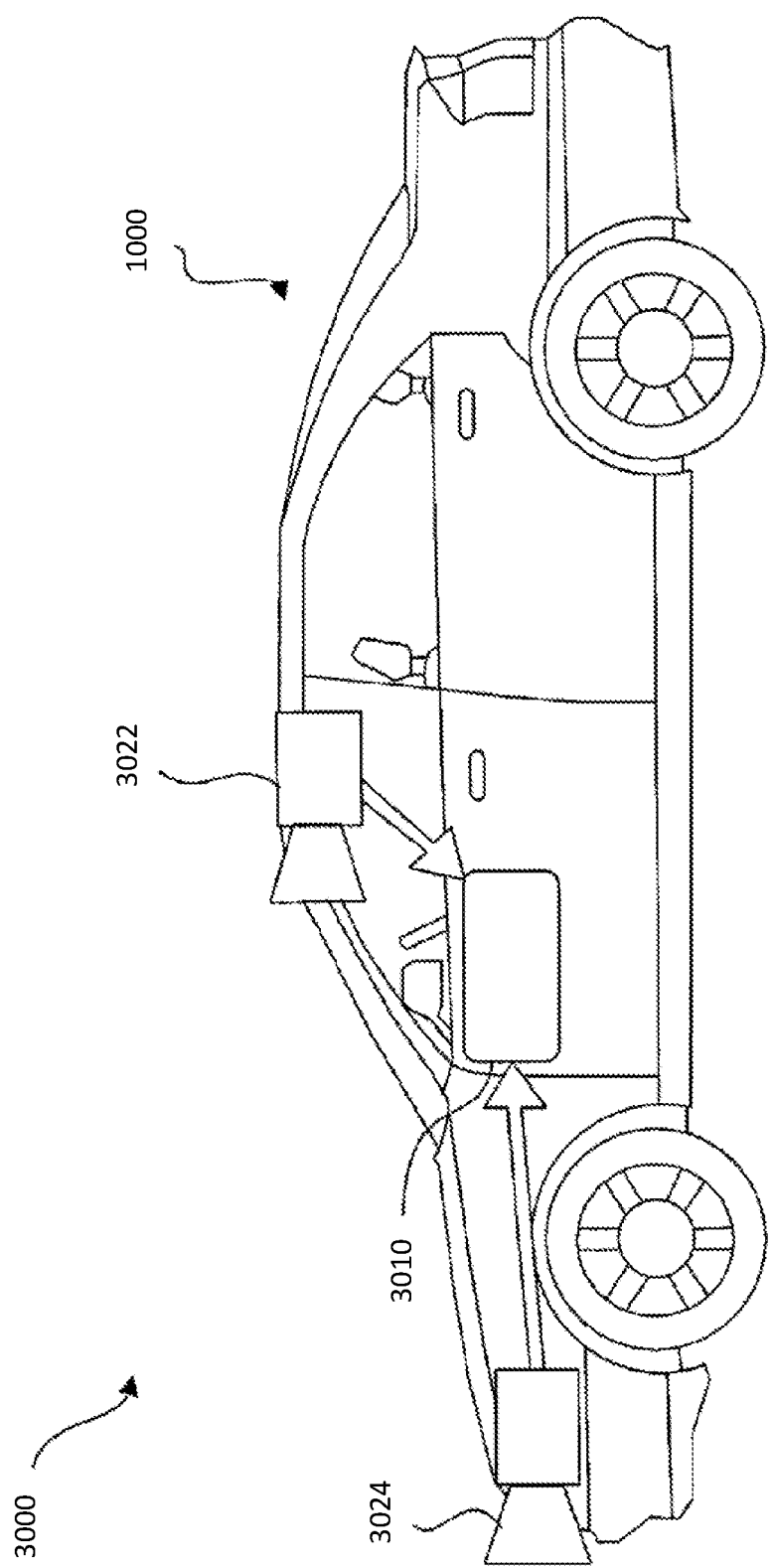
FIG. 4 is a diagram of an example of a side view of a vehicle including a vehicle control system in accordance with embodiments of this disclosure.

FIG. 4 is a diagram of an example of a side view of vehicle 1000 including a vehicle control system 3000 in accordance with embodiments of this disclosure. For example, vehicle 1000 may be equipped with a processing unit 3010 and any of the other components of vehicle control system 3000, as described above relative to FIG. 3. While in some embodiments vehicle 1000 may be equipped with only a single image capture device (e.g., camera), in other embodiments, multiple image capture devices may be used. For example, either of image capture devices 3022 and 3024 of vehicle 1000, as shown in FIG. 4, may be part of an Advanced Driver Assistance Systems (ADAS) imaging set.

The image capture devices included on vehicle 1000 as part of the image acquisition unit 3020 may be positioned at any suitable location. In some embodiments, image capture device 3022 may be located in the vicinity of the rearview mirror. This position may provide a line of sight similar to that of the driver of vehicle 1000, which may aid in determining what is and is not visible to the driver. Image capture device 3022 may be positioned at any location near the rearview mirror, but placing image capture device 3022 on the driver side of the mirror may further aid in obtaining images representative of the driver's field of view and/or line of sight.

Other locations for the image capture devices of image acquisition unit 3020 may also be used. For example, image capture device 3024 may be located on or in a bumper of vehicle 1000. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 3022, 3024, and 3026) may also be located in other locations. For example, the image capture devices may be located on or in one or both of the side mirrors of vehicle 1000, on the roof of vehicle 1000, on the hood of vehicle 1000, on the trunk of vehicle 1000, on the sides of vehicle 1000, mounted on, positioned behind, or positioned in front of any of the windows of vehicle 1000, and mounted in or near light fixtures on the front and/or back of vehicle 1000.

In addition to image capture devices, vehicle 1000 may include various other components of vehicle control system 3000. For example, processing unit 3010 may be included on vehicle 1000 either integrated with or separate from an engine control unit (ECU) of the vehicle. Vehicle 1000 may also be equipped with a position sensor 3030, such as a GPS receiver and may also include a map database 3060 and memory units 3040 and 3050.

As discussed earlier, wireless transceiver 3072 may and/ or receive data over one or more networks (e.g., cellular networks, the Internet, etc.). For example, wireless transceiver 3072 may upload data collected by vehicle control system 3000 to one or more servers, and download data from the one or more servers. Via wireless transceiver 3072, vehicle control system 3000 may receive, for example, periodic or on demand updates to data stored in map database 3060, memory 3040, and/or memory 3050. Similarly, wireless transceiver 3072 may upload any data (e.g., images captured by image acquisition unit 3020, data received by position sensor 3030 or other sensors, vehicle control systems, etc.) from vehicle control system 3000 and/or any data processed by processing unit 3010 to the one or more servers.

Vehicle control system 3000 may upload data to a server (e.g., to the cloud) based on a privacy level setting. For example, vehicle control system 3000 may implement privacy level settings to regulate or limit the types of data (including metadata) sent to the server that may uniquely identify a vehicle and or driver/owner of a vehicle. Such settings may be set by user via, for example, wireless transceiver 3072, be initialized by factory default settings, or by data received by wireless transceiver 3072.

Figure 5:
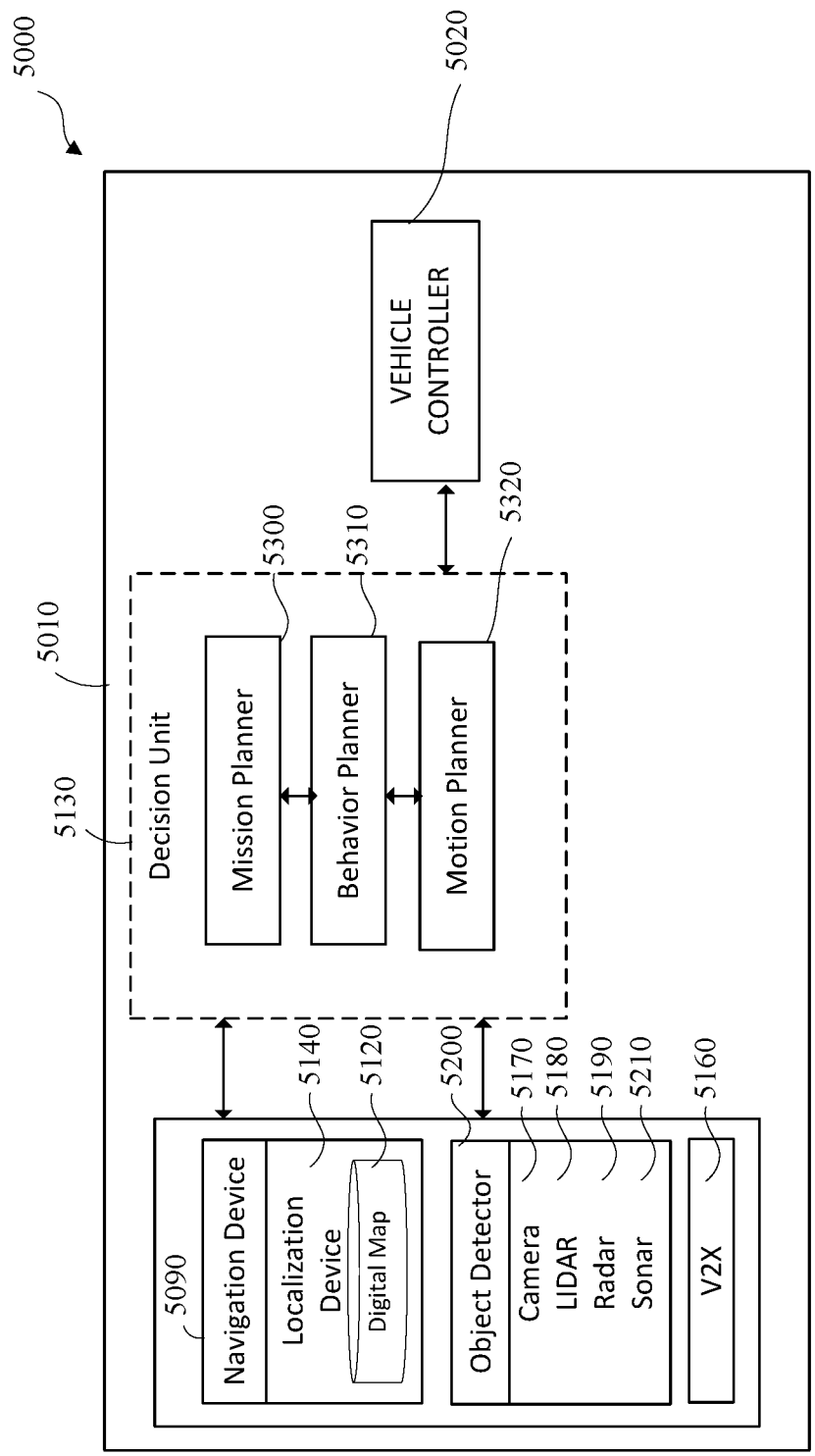
FIG. 5 is a diagram of an example of a vehicle control system in accordance with embodiments of this disclosure.

FIG. 5 is a diagram of an example of a vehicle system architecture 5000 in accordance with embodiments of this disclosure. The vehicle system architecture 5000 may be implemented as part of a host vehicle 5010.

Referring to FIG. 5, the vehicle system architecture 5000 includes a navigation device 5090, a decision unit 5130, object detector 5200, V2X communications 5160 and a vehicle controller 5020. The navigation device 5090 may be used by the decision unit 5130 to determine a travel path of the host vehicle 5010 to a destination. The travel path, for example, may include a travel route or a navigation path. The navigation device 5090, the decision unit 5130 and the vehicle controller 5020 may be collectively used to determine where to steer the host vehicle 5010 along a roadway such that the host vehicle 5010 is appropriately located on the roadway relative to, for example, lane markings, curbs, traffic signs, pedestrians, other vehicles, etc., determine a route based on a digital map 5120 that the host vehicle 5010 is instructed to follow to arrive at a destination, or both.

In order to determine where the host vehicle 5010 is located on the digital map 5120, the navigation device 5090 may include a localization device 5140, such as a GPS/GNSS receiver and an inertial measurement unit (IMU). A camera 5170, a radar unit 5190, a sonar unit 5210, a LIDAR unit 5180 or any combination thereof may be used to detect relatively permanent objects proximate to the host vehicle 5010 that are indicated on the digital map 5120, for example, traffic signals, buildings, etc., and determine a relative location relative to those objects in order to determine where the host vehicle 5010 is located on the digital map 5120. This process may be referred to as map localization. The functions of the navigation device 5090, the information provided by the navigation device 5090, or both, may be all or in part by way of V2I communications, V2V communications, vehicle-to-pedestrian (V2P) communications, or a combination thereof, which may generically be labeled as V2X communications 5160.

In some implementations, an object detector 5200 may include the sonar unit 5210, the camera 5170, the LIDAR unit 5180, and the radar unit 5190. The object detector 5200 may be used to detect the relative location of another entity, and determine an intersection point where another entity will intersect the travel path of the host vehicle 5010. In order to determine the intersection point and the relative timing of when the host vehicle 5010 and another entity will arrive at the intersection point, the object detector 5200 may be used by the vehicle system architecture 5000 to determine, for example, a relative speed, a separation distance of another entity from the host vehicle 5010, or both. The functions of the object detector 5200, the information provided by the object detector 5200, or both, may be all or in part by way of V2I communications, V2V communications, V2P communications, or a combination thereof, which may generically be labeled as V2X communications 5160. Accordingly, the vehicle system architecture 5000 may include a transceiver to enable such communications.

The vehicle system architecture 5000 includes a decision unit 5130 that is in communication with the object detector 5200, and the navigation device 5090. The communication may be by way of, but not limited to, wires, wireless communication, or optical fiber. The decision unit 5130 may include a processor(s) such as a microprocessor or other control circuitry such as analog circuitry, digital circuitry, or both, including an application specific integrated circuit (ASIC) for processing data. The decision unit 5130 may include a memory, including non-volatile memory, such as electrically erasable programmable read-only memory (EEPROM) for storing one or more routines, thresholds, captured data, or a combination thereof. The decision unit 5130 may include at least a mission planner 5300, behavior planner 5310 and motion planner 5320, which collectively determine or control route or path planning, local driving behavior and trajectory planning for the host vehicle 5010.

The vehicle system architecture 5000 includes a vehicle controller or trajectory tracker 5020 that is in communication with the decision unit 5130. The vehicle controller 5020 may execute a defined geometric path (which may be provided by the motion planner 5320 or the decision unit 5130) by applying appropriate vehicle commands such as steering, throttle, braking and the like motions to physical control mechanisms such as steering, accelerator, brakes, and the like that guide the vehicle along the geometric path. The vehicle controller 5020 may include a processor(s) such as a microprocessor or other control circuitry such as analog circuitry, digital circuitry, or both, including an application specific integrated circuit (ASIC) for processing data. The vehicle controller 5020 may include a memory, including non-volatile memory, such as electrically erasable programmable read-only memory (EEPROM) for storing one or more routines, thresholds, captured data, or a combination thereof.

The host vehicle 5010 may operate in automated mode where a human operator is not needed to operate the vehicle 5010. In the automated mode, the vehicle control system 5000 (using for example the vehicle controller 5020, the decision unit 5130, navigation device 5090, the object detector 5200 and the other described sensors and devices) autonomously controls the vehicle 5010. Alternatively, the host vehicle may operate in manual mode where the degree or level of automation may be little more than providing steering advice to a human operator. For example, in manual mode, the vehicle system architecture 5000 may assist the human operator as needed to arrive at a selected destination, avoid interference or collision with another entity, or both, where another entity may be another vehicle, a pedestrian, a building, a tree, an animal, or any other object that the vehicle 5010 may encounter.

The navigation systems described herein are configured to determine a travel path for the host vehicle. A method for motion planning is described herein that separates path planning and velocity planning and where path planning may use reference lines in combination with sampling-based motion planners to determine paths. Separation of the motion planning into path planning and velocity planning reduces the dimensionality of the search problem and results in a more efficient search for the path. Path planning may search for a collision-free path and velocity planner may generate an optimal velocity along the path taking into the motion objectives and maneuver requirements.

In an example, the motion planning may be done with respect to a S-L coordinate system, Cartesian coordinate system, east, north, up (ENU) coordinate system, Universal Transverse Mercator (UTM) coordinate system or the like. In an example embodiment, the motion planning may be done with respect to a S-L coordinate system. In the S-L coordinate system, given a reference line (usually the center line of the road), a station (S) of a point is a distance along the reference line from an origin and a lateral (L) is the perpendicular distance of that point from the reference line. An optimal path, the result of motion planning in the S-L coordinate system, may be close to the reference line, which is ideal for vehicle motion. By using the S-L coordinate system, the motion planning speeds up the search time by ignoring the geometrical shape of the road. Moreover, motion planners such as sampling-based motion planners, RRT and its variants (collectively RRT-type) benefit from using the S-L coordinate since it helps speed up the exploration rate in the S-L coordinate system space.

Figure 6:
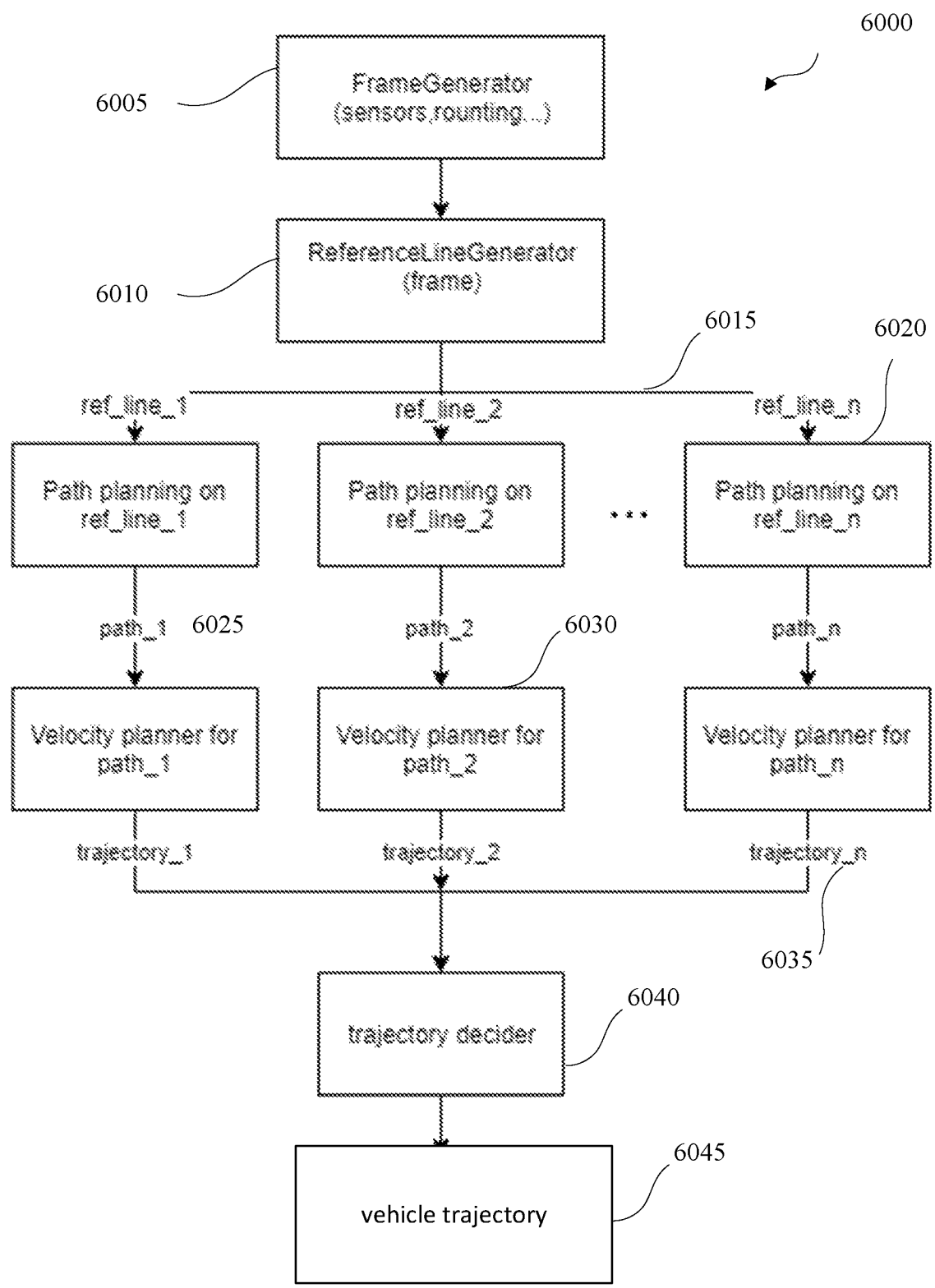
FIG. 6 is a diagram of an example of a general framework for motion planning using reference lines in accordance with embodiments of this disclosure.

FIG. 6 is a diagram of an example of a general framework and system 6000 for motion planning using reference lines in accordance with embodiments of this disclosure. The system 6000 may provide an online and real-time motion planning method using reference lines and historical data with sampling-based motion planning algorithms. The system 6000 may include a frame generator 6005, a reference generator 610, motion planners including path planners 6020 and velocity planners 6030, and a trajectory decider 6045. The frame generator 6005 obtains sensor and route information. The reference line generator 6010 may generate a plurality of reference lines 6015 from the information provided by the framer generator 6005. The path planners 6020 may operate on respective reference lines 6015 to generate paths 6025. The path planners may use RRT-type, Rapidly-exploring Random Graph (RRG), Stable Sparse Trees (SST) and the like algorithms to determine the paths 6025 in the S-L coordinate system, for example. The velocity planners 6030 may process respective generated paths 6025 to generate a speed profile for each path and generate respective trajectories 6035. The trajectory decider 6040 may select from the trajectories 6035 a vehicle trajectory 6045 to send to a vehicle controller.

In an example, the path planner 6020 may use a RRT-type algorithm to find an optimal path. These algorithms are dependent on completing a number of iterations to determine the optimal path. The number of iterations needed, however, may not be possible in a given planning cycle as planning cycles should be limited to a time window or a frame to ensure the system can run in real-time. As a result, these algorithms may not be able to determine an optimal path in the limited time.

In an implementation, the path planner 6020 may use a planning history of previous planning cycle(s) to reduce the time needed to determine the optimal path. The motion planner 6015 may continuously refine the path from a previous planning cycle or previous planning cycle(s) using historical path data and extend the path to the new target. As a result, every planning cycle may determine a better path than the previous cycle and the new path may not diverge (or may minimally diverge) from the previous path. This minimizes changes to vehicle motion.

Due to the combining of the RRT-type path planning on a S-L coordinate system, the RRT-type algorithms may generate optimal paths which are close to the reference line. Consequently, the vehicle motion may also be close to the reference line, which is generally the center of the lane. This is ideal or near ideal motion for the vehicle. The example path planner 6020 also accounts for multiple path constraints such as, for example, distance to obstacles, distance to center line, distance to lane boundary, and the like. These multiple path constraints may be described as cost functions which may provide a robust method to determine the best or optimal path.

In an example, after a path is generated, a velocity planner may be utilized to generate the speed profile on the reference path. The velocity planner may consider vehicle dynamics, motion preferences, and maneuver requirement.

Figure 7:
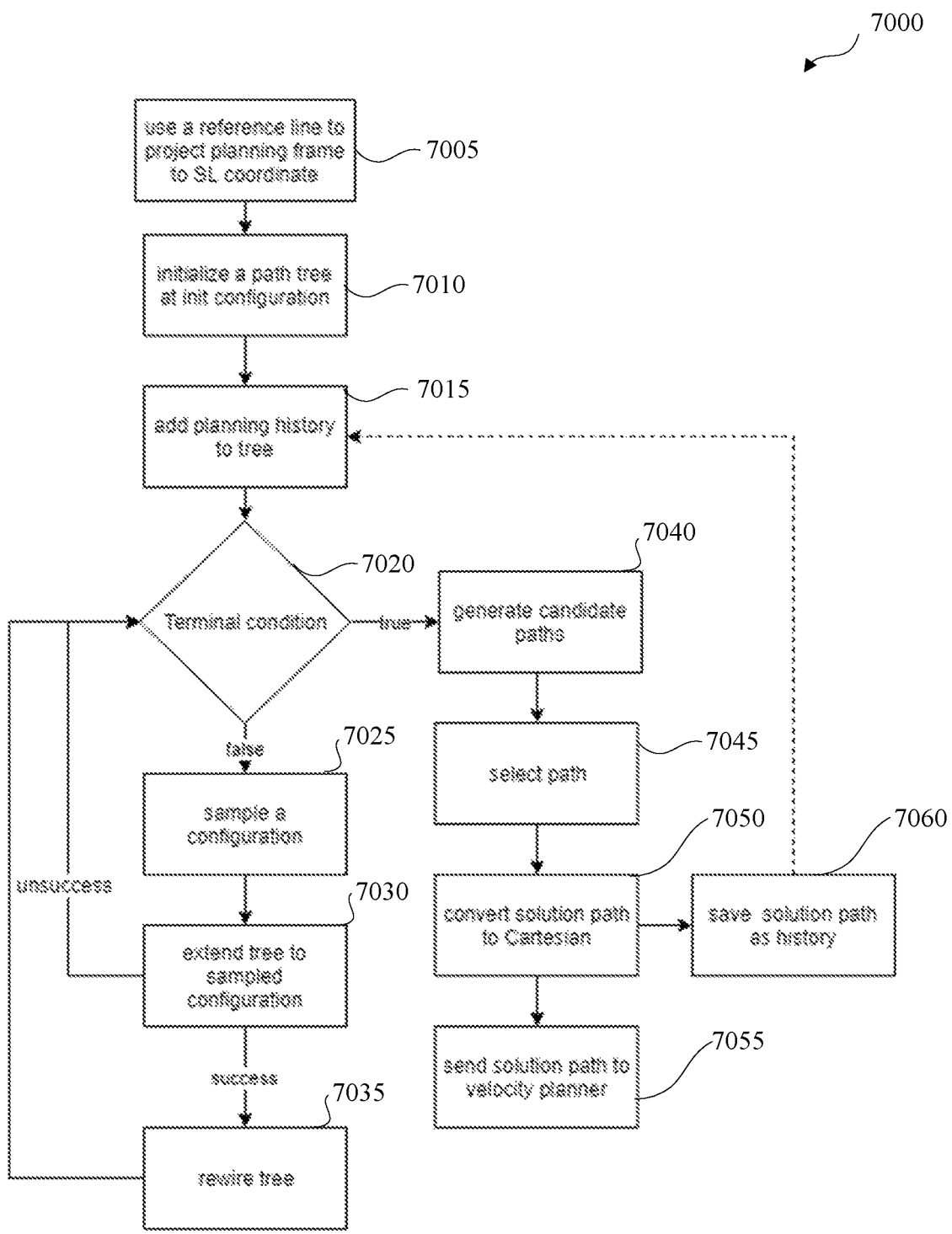
FIG. 7 is a diagram of an example of a method for motion planning using reference lines in accordance with embodiments of this disclosure.

FIG. 7 is a diagram of an example of a technique or method 7000 for path planning using reference lines in accordance with embodiments of this disclosure. The method 7000 includes: using 7005 a reference line to convert all planning data into S-L coordinates; initializing 7010 a path tree; adding 7015 planning history to the path tree; checking 7020 if a terminal condition has been met; sampling 7025 a configuration in S-L coordinates if a terminal condition has not been met; extending 7030 the path tree to the sampled configuration; rewiring 7035 the path tree if extension to sampled configuration is successful and returning to check terminal condition if extension is unsuccessful; generating 7040 candidate paths when the terminal condition is met; selecting 7045 a solution path from the candidate paths; converting 7050 the solution path to Cartesian coordinates; sending 7055 the solution path to a velocity planner; and saving 7060 the solution path as path planning history for the next planning cycle. For example, the technique 7000 may be implemented by the decision unit 5130 shown in FIG. 5, the motion planner 5320 shown in FIG. 5, the control system 1010 shown in FIG. 1, the processor 1020 shown in FIG. 1 or FIG. 2 or the processing unit 3010 shown in FIG. 3 or FIG. 4.

The method 7000 includes using 7005 a reference line to convert all planning data into S-L coordinates. In an implementation, the using 7005 may include projecting vehicle information and vehicle surrounding environment information to the S-L coordinate system using the reference lines. The vehicle information and vehicle surrounding environment information may include initial point information, obstacles, lane information, traffic regulations and the like.

The method 7000 includes initializing 7010 a path tree. In an implementation, the path tree may be used to assist in converging to a path solution. In an implementation, the initializing 7010 initializes the path tree. In an implementation, the path tree includes vertices and edges. Each vertex may contain a configuration along with necessary information such as a timestamp, traveled distance, car status, cost to reach a vertex's configuration or the like. In an implementation, a configuration may include position (x, y) and orientation (θ) related to or associated with a vehicle. An edge connects two vertices to each other. The path tree may be rooted at an initial configuration and expanded by adding vertices and edges into the path tree. In an implementation, the cost to reach a vertex's configuration may include but not limited to traveled distance, smoothness, safety and the like.

The method 7000 includes adding 7015 planning history to the path tree. In an implementation, the path tree may be revised based on a previous path plan or solution. In an implementation, the planning history may include a set of configurations from a previous path solution. These configurations are projected into S-L coordinates and then added to the path tree in succession by using the same tree extension process.

The method 7000 includes checking 7020 if a terminal condition has been met. In an implementation, a terminal condition could be a time limit or a number of iterations to limit how long a planning cycle may run so that the path solutions may be appropriately generated.

The method 7000 includes sampling 7025 a configuration state in S-L coordinates if a terminal condition has not been met. A configuration state is sampled in S-L coordinates for the purpose of extending the path tree.

The method 7000 includes extending 7030 the path tree to the sampled configuration. In an implementation, a RRT-type algorithm may be used to extend the path tree to the sampled configuration.

The method 7000 includes rewiring 7035 the path tree if an extension to the sampled configuration is successful and returning to check the terminal condition if the extension is unsuccessful. In an implementation, a successful extension may refer to having a vertex in a path tree that can generate a valid connection from that vertex's configuration to a sampled configuration. In an implementation, a valid connection is a connection without collision and satisfies configuration constraints. For example, configuration constraints may be $x_{min} < x < x_{max}$; $y_{min} < y < y_{max}$; $\theta_{min} < \theta < \theta_{max}$ and the like. In an implementation, a rewire process is invoked to rewire the edges in the path tree to improve the path tree quality.

The method 7000 includes generating 7040 candidate paths when the terminal condition is met. In an implementation, a set of paths is generated as candidates for solution paths. A path planning goal may be specified by mission and behavior planning. A set of vertices in a path tree that satisfy the path planning goal may be selected as goal configurations. A set of paths (called candidate paths) may be generated by concatenating the configurations associated with the edge that connect a root configuration to the goal configurations.

The method 7000 includes selecting 7045 a solution path from the candidate paths. A solution path may include selecting a path with the best path cost. A path cost may include, and is not limited to, distance travel, smoothness, comfort, safety, or any combination thereof The method 7000 includes converting 7050 the solution path to Cartesian coordinates.

The method 7000 includes sending 7055 the solution path to a velocity planner.

The method 7000 includes saving 7060 the solution path as path planning history for the next planning cycle.

Figure 8:
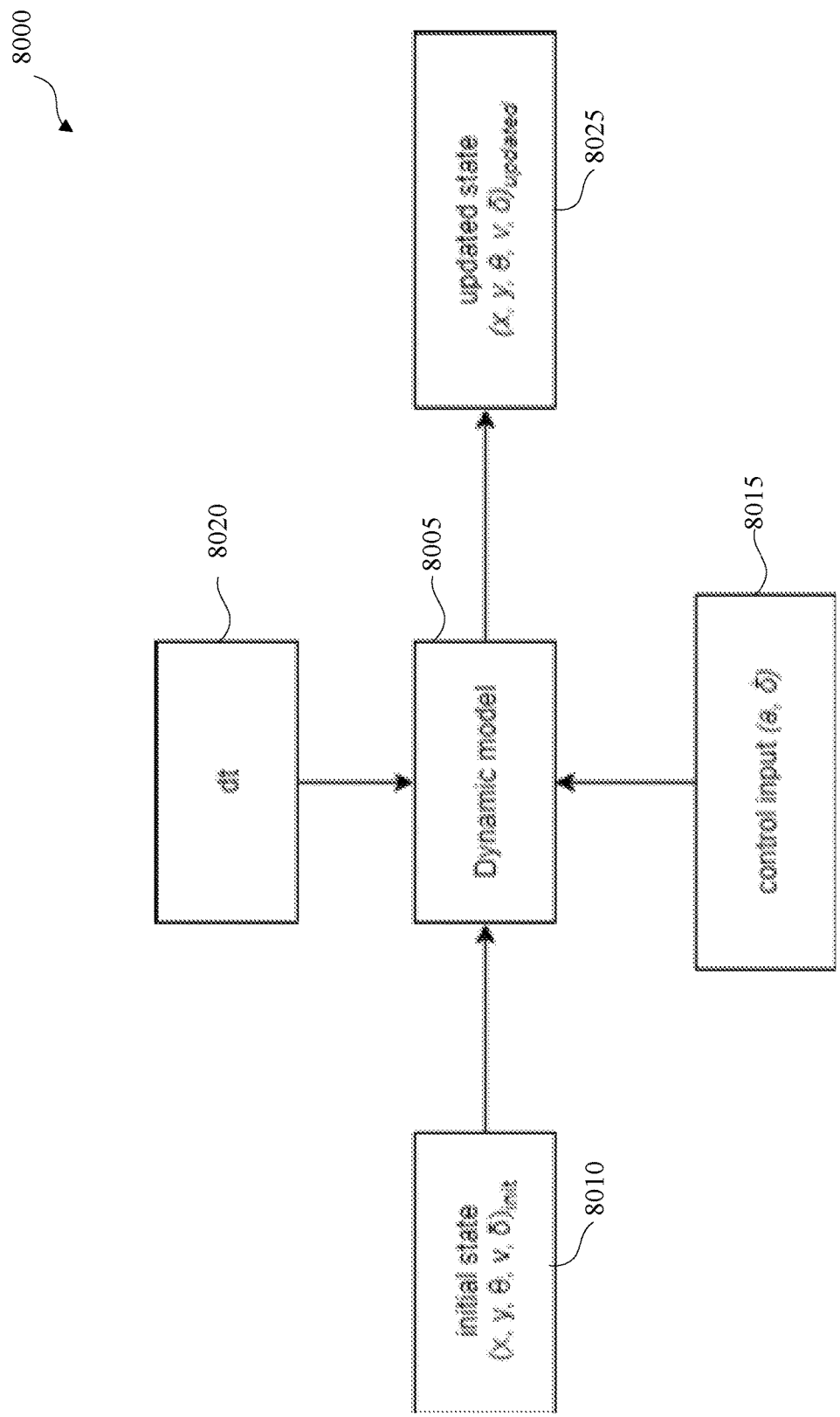
FIG. 8 is a block diagram of an example of input and output dynamics for motion planning using reference lines in accordance with embodiments of this disclosure.

FIG. 8 is a block diagram of an example of using vehicle dynamics for motion planning in accordance with embodiments of this disclosure. FIG. 8 is a computational costing process 8000 block diagram to estimate an updated state using a vehicle dynamic model based on the initial state, time interval dt, and control input. In an implementation, a vehicle dynamic model 8005 may have an initial state 8010, a control input 8015, and time 8020 as inputs and may have an updated state 8025 as an output. For example, the control input 8015 may be applied to the initial state 8010 over a time dt 8020 on the vehicle dynamic model 8005 to generate an updated state 8025.

Pre-calculation of the vehicle dynamic model and using stored results in the LUT may assist to reduce the processing time. The access parameters or inputs for the LUT are the vehicle initial state and the input control. Based on these inputs, the LUT provides the updated state when the input control is applied to the vehicle initial state over a time interval dt. In an implementation, the LUT may be pre-calculated and stored offline.

In an implementation, the computational aspects shown in FIG. 8 may be accelerated by using a look-up table (LUT). Given an initial state $s=(x, y, \theta, v, \delta)_{init}$ and an input control $u=(a, \dot{\delta})$ for a time interval dt, an updated state $(x, y, \theta, v, \delta)_{updated}$ may be calculated from the LUT, where x and y are positions, θ is orientation, v is velocity, a is acceleration, δ is steering angle, and $\dot{\delta}$ is steering rate. In an implementation, the LUT may be pre-calculated and stored offline.

Figure 9:
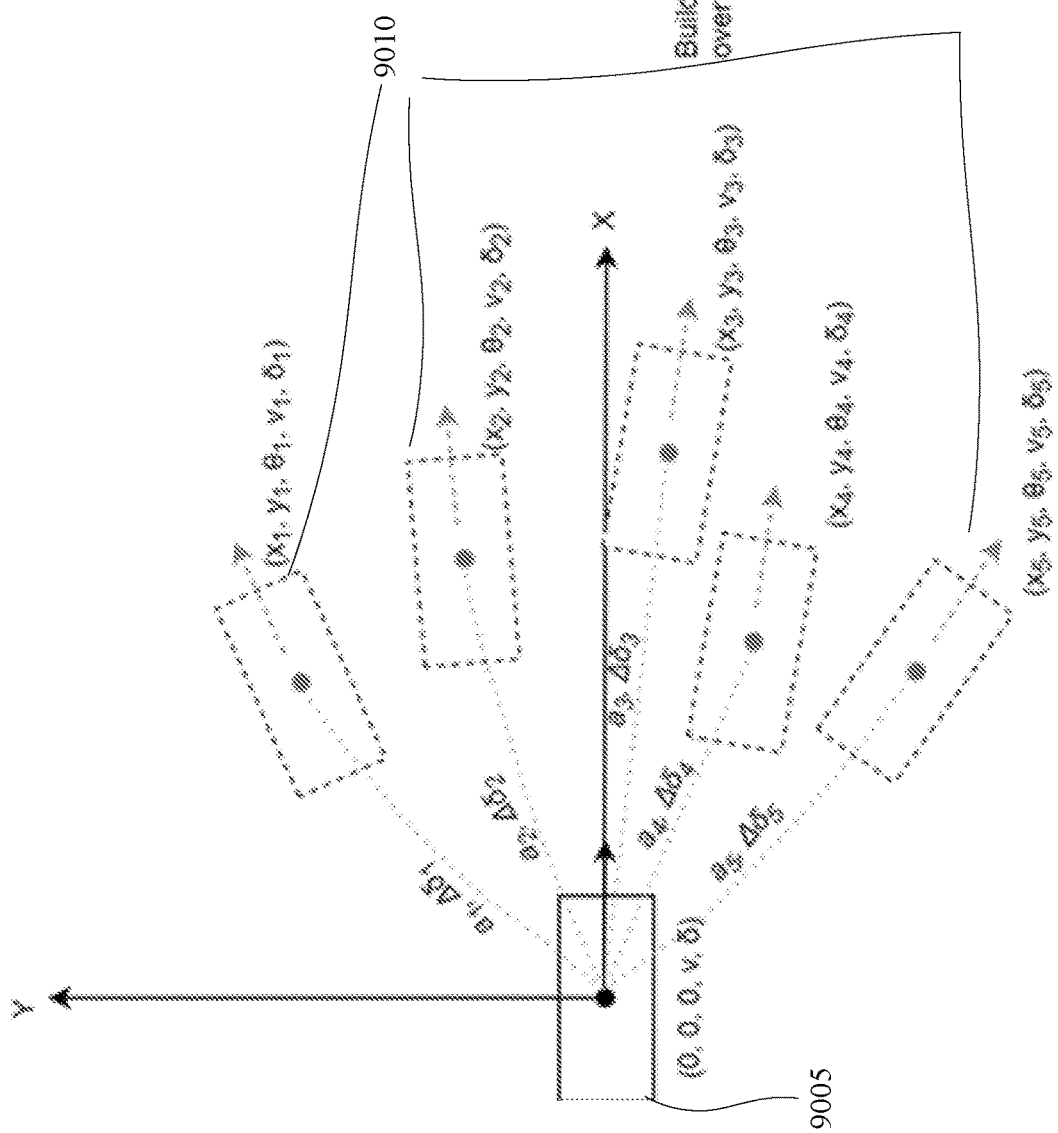
FIG. 9 is a block diagram of an example of how a look-up table is populated in accordance with embodiments of this disclosure.

FIG. 9 is a block diagram 9000 of an example of how a vehicle dynamic model LUT is populated in accordance with embodiments of this disclosure. An input for the LUT is an initial state and control state combination of $(v, \delta, a, \dot{\delta})$ which refers to (initial velocity, initial steering angle, input acceleration, input steering rate), where the position is initialized to (0, 0, 0, v, δ). For each initial state (v, δ) and control input $(a, \dot{\delta})$, an updated state may be calculated by the vehicle dynamic model. As shown in FIG. 9, when the LUT is populated, the x, y, and θ parameters of the initial state 9005 are set to zero to reduce the number of inputs for the LUT. The LUT may then be populated with updated states 9010 corresponding to possible motions. The LUT may be populated for use in velocity planner and motion planner.

Figure 10:
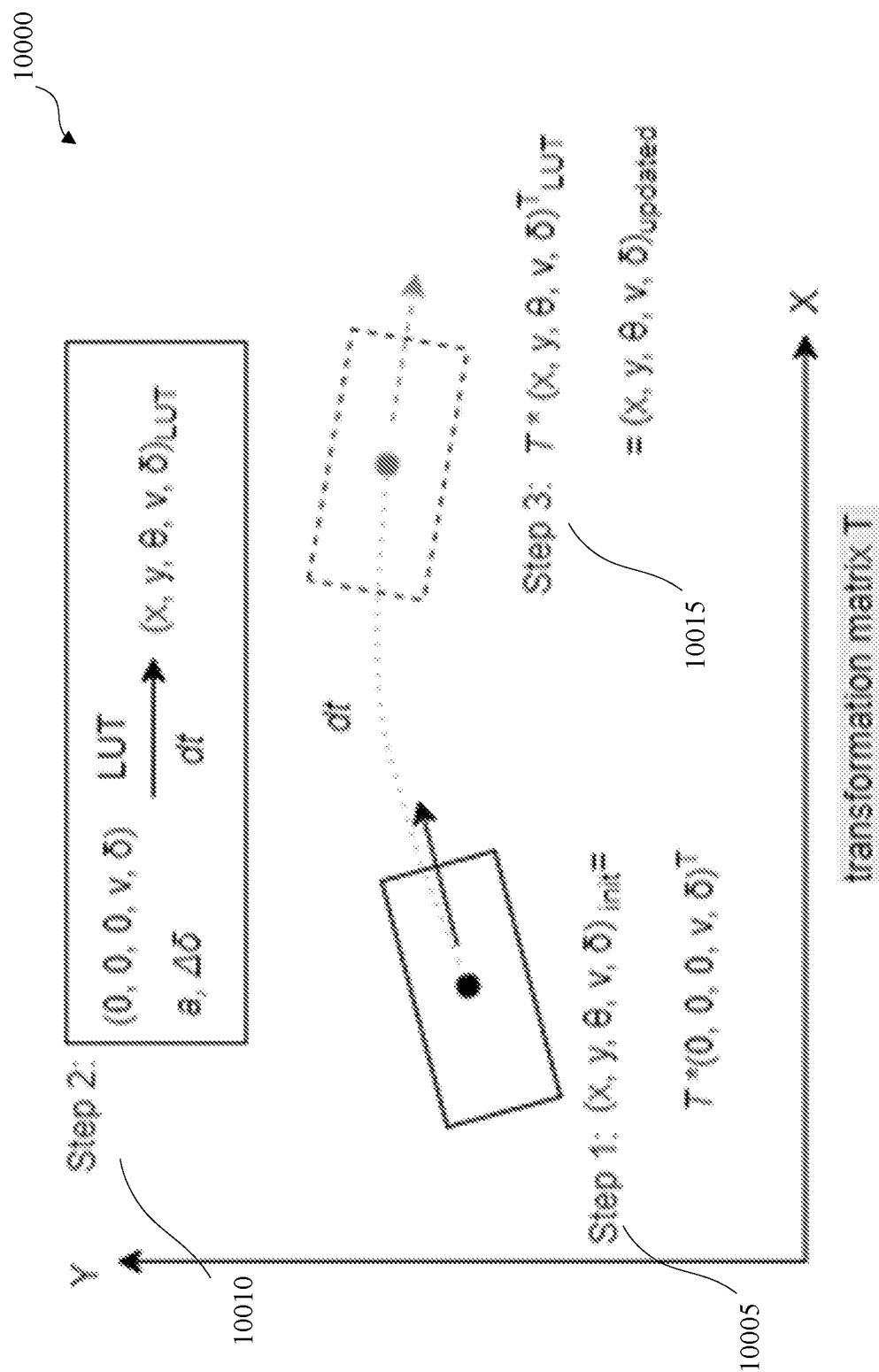
FIG. 10 is a block diagram of an example of how a look-up table is used in accordance with embodiments of this disclosure.

FIG. 10 is a block diagram of an example of how a LUT is used in accordance with embodiments of this disclosure. Described is an example method 10000 for using a dynamic model LUT. The method 10000 may be used to find an updated state when a control input u=(α, δ̇) is applied to the vehicle initial state s=(x, y, θ, v, δ)$_{init}$.

In a first step 10005, for a state s=(x, y, θ, v, δ)$_{init}$, a translate vector T is determined to translate from initial state s=(x, y, θ, v, δ)$_{init}$ to an updated state s=(x, y, θ, v, δ)$_{updated}$.

In the second step 10010, a result state s=(x, y, θ, v, δ)$_{LUT}$ is obtained from the LUT using (v, δ, a, δ̇) as the input.

In the third step 10015, the translate vector T is used to translate the position of s=(x, y, θ, v, δ)$_{LUT}$ to a correct result state (x, y, θ, v, δ)$_{updated}$ when u=(a, δ̇) is applied to a state s=(x, y, θ, v, δ)$_{init}$.

A method for motion planning in an autonomous vehicle (AV) includes using at least one reference line to project planning data into a S-L coordinate system, wherein S of a point is a distance along the reference line from a point of origin and L is a perpendicular distance from the point to the reference line; applying a motion planner algorithm to the at least one reference line using previous path planning history to generate a path in the S-L coordinate system; determining a velocity for the path; and updating an AV controller with the path and the velocity. In an implementation, the method includes initializing a path tree and adding previous path planning history to the path tree. In an implementation, the method includes converting the path in the S-L coordinate system to a Cartesian coordinate system. In an implementation, the method includes the adding further includes saving the converted path to the path planning history and adding the path planning history to the path tree. In an implementation, the method includes iteratively generating paths if a terminal condition is not met, generating candidate paths in the S-L coordinate system when terminal condition is met and selecting a solution path from the candidate paths. In an implementation, the iteratively generating paths includes sampling a configuration space for path extension, wherein a sampling-based motion planner algorithm is used for path extension. In an implementation, the method includes extending the path tree to a sampled configuration and rewiring the path tree if extension to the sampled configuration is successful. In an implementation, the method includes the path extension is successful if no collisions exist. In an implementation, the sampling-based motion planner algorithm is a Rapidly-exploring Random Trees (RRT) type algorithm. In an implementation, velocity determination uses a look-up table (LUT) to reduce processing time by pre-storing motion data. In an implementation, vehicle initial state and an input control are used to access the LUT.

A vehicle control system for controlling an autonomous vehicle (AV) includes a vehicle controller and a decision unit. The decision unit is configured to use at least one reference line to project planning data into a S-L coordinate system, wherein S of a point is a distance along the reference line from a point of origin and L is a perpendicular distance from the point to the reference line, apply a motion planner algorithm to the at least one reference line using previous path planning history to generate a path in the S-L coordinate system, determine a velocity based on the path, and update an AV controller with the path and the velocity. In an implementation, the decision unit is further configured to initialize a path tree and add previous path planning history to the path tree. In an implementation, the decision unit is further configured to convert the path in the S-L coordinate system to a Cartesian coordinate system. In an implementation, the decision unit is further configured to save the converted path to the path planning history and add the path planning history to the path tree. In an implementation, the decision unit is further configured to iteratively generate paths if a terminal condition is not met, generate candidate paths in the S-L coordinate system when terminal condition is met and select a solution path from the candidate paths. In an implementation, the decision unit is further configured to sample a configuration space for path extension, wherein a sampling-based motion planner algorithm is used for path extension. In an implementation, the decision unit is further configured to extend the path tree to a sampled configuration and rewire the path tree if extension to the sampled configuration is successful. In an implementation, the sampling-based motion planner algorithm is a Rapidly-exploring Random Trees (RRT) type algorithm. In an implementation, velocity determination uses a look-up table (LUT) to reduce processing time by pre-storing motion data and vehicle initial state and an input control are used to access the LUT.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for motion planning in an autonomous vehicle (AV), the method comprising:
    using at least one reference line to project planning data into a S-L coordinate system, wherein S of a point is a distance along the reference line from a point of origin and L is a perpendicular distance from the point to the reference line;
    applying a sampling-based motion planner algorithm to the at least one reference line using previous path planning history to generate a path in the S-L coordinate system;
    determining a velocity for the path;
    updating an AV controller with the path and the velocity.

2. The method of claim 1, the method further comprising:
    initializing a path tree, wherein the path tree includes a configuration space at each vertex, the configuration space including position and orientation information for the AV;
    adding previous path planning history to the path tree.

3. The method of claim 2, the method further comprising:
    converting the path in the S-L coordinate system to a Cartesian coordinate system.

4. The method of claim 3, wherein the adding further comprising:
    saving the converted path to the path planning history; and
    adding the path planning history to the path tree.

5. The method of claim 1, the method further comprising:
    iteratively generating paths if a terminal condition is not met; and
    generating candidate paths in the S-L coordinate system when terminal condition is met; and
    selecting a solution path from the candidate paths.

6. The method of claim 5, wherein the iteratively generating paths further comprises:
    sampling a configuration space for path extension, wherein the sampling-based motion planner algorithm is used for path extension.

7. The method of claim 6, the method further comprising:
    extending the path tree to a sampled configuration; and
    rewiring the path tree if extension to the sampled configuration is successful.

8. The method of claim 6, wherein the path extension is successful if no collisions exist.

9. The method of claim 6, wherein the sampling-based motion planner algorithm is a Rapidly-exploring Random Trees (RRT) type algorithm.

10. The method of claim 1, wherein velocity determination uses a look-up table (LUT) to reduce processing time by pre-storing a vehicle dynamic model.

11. The method of claim 10, wherein vehicle initial state and an input control are used to access the LUT.

12. A vehicle control system for controlling an autonomous vehicle (AV), the vehicle control system comprising:
    an AV controller; and
    a decision unit configured to:

use at least one reference line to project planning data into a S-L coordinate system, wherein S of a point is a distance along the reference line from a point of origin and L is a perpendicular distance from the point to the reference line;

apply a sampling-based motion planner algorithm to the at least one reference line using previous path planning history to generate a path in the S-L coordinate system;

determine a velocity based on the path;

update the AV controller with the path and the velocity.

13. The vehicle control system of claim 12, wherein the decision unit is further configured to:

initialize a path tree, wherein the path tree includes a configuration space at each vertex, the configuration space including position and orientation information for the AV; and add previous path planning history to the path tree.

14. The vehicle control system of claim 13, wherein the decision unit is further configured to:

convert the path in the S-L coordinate system to a Cartesian coordinate system.

15. The vehicle control system of claim 14, wherein the decision unit is further configured to:

save the converted path to the path planning history; and add the path planning history to the path tree.

16. The vehicle control system of claim 13, wherein the decision unit is further configured to:

iteratively generate paths if a terminal condition is not met;

generate candidate paths in the S-L coordinate system when terminal condition is met; and select a solution path from the candidate paths.

17. The vehicle control system of claim 16, wherein the decision unit is further configured to:

sample a configuration space for path extension, wherein a sampling-based motion planner algorithm is used for path extension.

18. The vehicle control system of claim 17, wherein the decision unit is further configured to:

extend the path tree to a sampled configuration; and rewire the path tree if extension to the sampled configuration is successful.

19. The vehicle control system of claim 18, wherein the sampling-based motion planner algorithm is a Rapidly-exploring Random Trees (RRT) type algorithm.

20. The vehicle control system of claim 12, wherein velocity determination uses a look-up table (LUT) to reduce processing time by pre-storing a vehicle dynamic model and vehicle initial state and an input control are used to access the LUT.

* * * * *